United States Patent [19]

Fetsch

[11] 4,032,191
[45] June 28, 1977

[54] TWO-POSITION SCHOOL BUS SEAT

[76] Inventor: Joseph T. Fetsch, 26 Concord Road, Port Washington, N.Y. 11050

[22] Filed: Feb. 13, 1973

[21] Appl. No.: 332,063

[52] U.S. Cl. .............................. 297/440; 248/424
[51] Int. Cl.² ..................... A47C 5/10; B60N 1/06
[58] Field of Search ............ 297/337, 338, 283, 92, 297/311, 312, 118, 452, 443, 130, 440; 5/59 B, 12, 17; 248/424, 429, 430

[56] References Cited

UNITED STATES PATENTS

| 1,232,931 | 7/1917 | Kilburn | 297/440 |
| 1,256,936 | 2/1918 | Shaver | 297/337 |
| 1,545,097 | 7/1925 | Hansen | 297/452 |
| 2,845,112 | 7/1958 | Borenstein | 297/118 |
| 3,186,759 | 6/1965 | Reeves | 297/337 X |
| 3,245,715 | 4/1966 | Gits | 297/452 X |

FOREIGN PATENTS OR APPLICATIONS 442,459   2/1936   United Kingdom ............... 297/311

Primary Examiner—Roy D. Frazier

[57] ABSTRACT

A children's school bus seat is adjustable to either of two positions: (1) a forwardly projecting position to provide a longer depth seat for larger children with longer leg thighs; and (2) a backward position to provide a shorter depth seat for smaller children with short thighs; so all can sit back comfortably against the back rest cushion with their knees bent and legs dangling.

1 Claim, 4 Drawing Figures

TWO-POSITION SCHOOL BUS SEAT

This invention relates to school bus seats for transporting children and adults.

School buses for transporting school children, must accommodate small children, and also large children who are practically adults in size, particularly in leg length.

In adults the thigh dimension is relatively long, and bus seats are generally deep enough to accommodate the long thigh of the adult, with the leg still able to bend at the knee and dangle. In children, however, their thighs are still relatively short, and the usual bus seat is of such long depth, from front to rear, that it is not possible for a small child to sit comfortably against the back of the seat and have his knees able to bend enough so that his legs can dangle comfortably over the front edge of the seat. If the children sit back in order to have the comfort of the back rest, their legs are too short to bend at the knees, and consequently the calves of their legs rest on the front edge of the seat which they are occupying, and their legs soon tire.

Thus, if the child is sitting comfortably against the back of the seat, his legs are uncomfortable because they are resting on the front edge of the seat and can not bend down to dangle, with his feet resting on the floor. If, however, the child is sitting forward in order to have his legs bend and comfortably dangle so that his feet can touch the floor, then his back does not have the comfortable resting position against the back cushion of the seat.

The problem is to provide an adjustable school bus seat that may be adjustably positioned to occupy either of two positions, one in which the seat cushion will project forward enough to accommodate a tall adult child, and a second position suitable to accommodate a small child, with the child's back, in either case, resting against the back rest of the seat and with his legs bent at the knees, to permit his legs to bend at the knees and dangle over the front edge of the seat.

The object of this invention is to provide such an adjustable two-position school bus seat, in which the seat cushion can be easily and readily adjusted to a first position, to be in a short projecting position for a short child, or be adjusted to a second position in a forwardly projecting position to be in a long-projecting position to accommodate a tall child, so that either child can sit back and rest in comfort against the back rest of the seat, while sitting with his knees bent, so that the lower portions of the legs can dangle comfortably over the edge of the seat, to or toward the floor.

In one modification of a bus seat constructed in accordance with the present invention, the seating cushion is provided with positioning clips depending from the under surface of the cushion, to engage and brace against limiting or back-stop portions of the supporting frame for the seat, when the seating cushion is in either selected position. When the seating cushion is to be adjustably shifted from one position to the other position, the entire cushion is raised from its support and rotated in horizontal plane to reversely aligned horizontal position, and is then replaced on its supporting frame, so that the positioning clips will engage the limiting stops on the supporting frame in an appropriate position to locate the seat cushion in the second position. The clips are in two sets, and the two sets are on the cushion at different distances from the two transverse edges considering one edge as the number one edge and the other as the number two edge, since each edge will be front or rear according to its temporary positioning.

Thus, the clips of one set, numbered set one for convenience, on the bottom of the seating cushion, are positioned a short distance from the number one front edge surface of the seating cushion, and the clips of the second set are disposed a longer distance behind the number two front edge surface of the seating cushion.

When the number one clips, spaced near their transverse edge of the seat cushion, brace against the back-stop of the supporting frame, the full depth dimension of the seat cushion projects forward to maximum projection position, suitable for taller children or adults.

When the number two clips, spaced back from their transverse edge of the seat cushion are positioned to brace against the back-stop, part of the seat cushion extends backward, so that only a shorter length of the seat cushion projects forward, suitable for smaller children.

In order to accommodate the backwardly extending portion of the seating cushion, when the longer portion of the cushion behind the clips is disposed backwardly on the seat frame, the supporting back frame is provided with a recessed portion to define a receiving space for that backwardly extending portion of the seating cushion.

The details of construction of the two-position seat are described in more detail in the following specification, taken together with the accompanying drawings, in which.

The invention generally is to provide an adjustable two-position seat for a school bus, on which, by a very simple positional adjustment, the two-position seat may be shifted to either position, by merely shifting and rearranging the seating cushion, to comfortably accommodate either a small child, or a taller more mature child, so the riding child can sit backwardly and rest against the back rest of the seat, while at the same time being able to bend his legs at the knees for comfortable dangling over the front edge of the seat.

Figure 1:
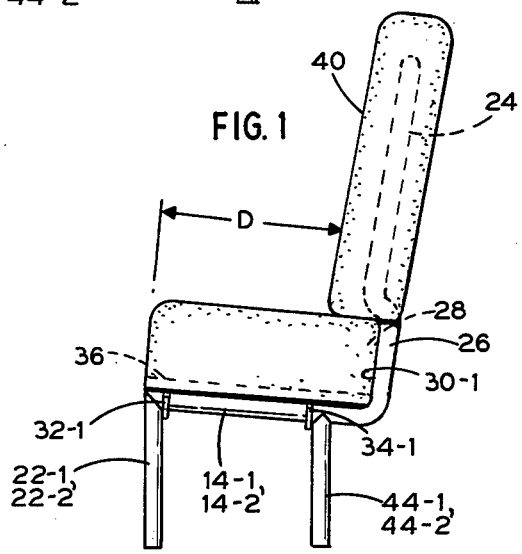
FIG. 1 is a side view of a seat showing the frame structure of the seat and the seating cushion in retracted backward position to accommodate a small child or a person with short legs.

As shown in FIG. 1, a seat 10 comprises a supporting frame 12 having a horizontal frame seat 14 consisting of two spaced horizontal front-to-back tubular elements 14-1 and 14-2, with coplanar side-to-side tubular elements 16-1 and 16-2 joined to constitute a horizontal seating frame 20, supported by adequate vertical leg supports 22, and mechanically coupled to support a back rest frame 24, through a flexible resilient C-shaped coupling frame section 26 that serves two purposes.

The C-section 26 serves one purpose in providing a flexible resilient element about which the back rest frame 24 can be angularly tilted slightly with respect to the bottom horizontal frame 20. A second purpose and function of the C-shape element 26 is to provide a backwardly recessed space 28 for accommodating a backwardly-extending portion of the seating cushion 30, when the seating cushion 30 is to be positioned in backward position, to provide a short depth front seating portion of the seating cushion for a small child, to permit his legs to dangle over the front surface 30-1 of the seating cushion 30.

In order to hold the seat cushion 30 in either selected position on the horizontal seating frame 20, the seat cushion 30 is provided with two sets of position-limiting clips or brackets 32-1 and 32-2 in one set, and 34-1 and 34-2 in a second set, on its under surface, suitably anchored on an internal frame 36 of the seat cushion 30.

The position of the seat cushion 30 shown in FIG. 1 provides a comfortable seating arrangement for a child with short legs, since a shorter depth —D— of the seat cushion 30 is in front of the back rest 40, and the child may sit back and rest against the back cushion rest 40.

Figure 2:
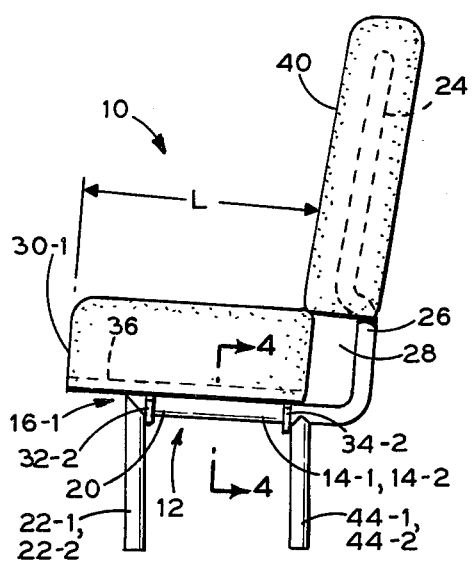
FIG. 2 is a view similar to that in FIG. 1, but with the seating cushion reversed to provide a larger forwardly extending portion for a taller or long-legged person.
Figure 3:
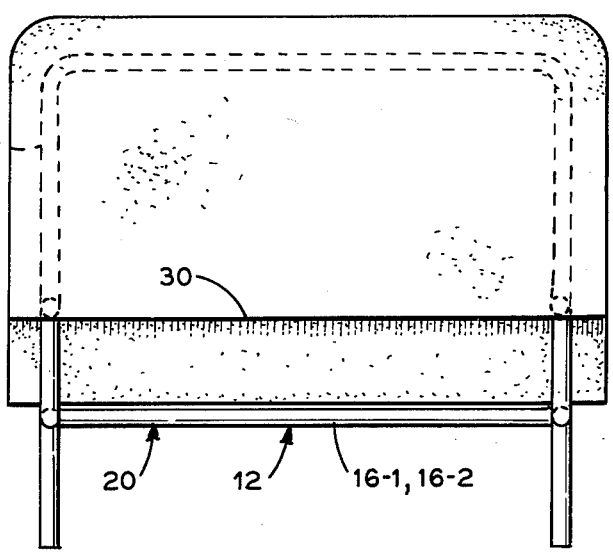
FIG. 3 is a rear elevational view of the frame and seat.

To hold the seat cushion 30 in position, as in FIG. 1, the front or number-one set of clips, 32-1 and 32-2 (the latter seen in FIG. 2, is on the remote side frame tube 14-2), snap down over the side frame tubes 14-1 and 14-2, in position shown. The side frame tubes 14-1 and 14-2 and the front and back connecting tubes are preferably welded to provide the supporting frame for the seating cushion 30. Clip 32-1 rests against the back peripheral contour surface of the front vertical tubular support 22-1. The other front clip 32-2, not seen in FIG. 1, rests on the other side rail frame tube 14-2 not seen in FIG. 1, and similarly braces against the back contour surface of the other front vertical tubular support 22-2, not shown in FIG. 1.

The back end of the seat cushion 30 retracts backward into the concave space 28 of the C-shaped frame 26, in FIG. 1.

The second set of clips, numbered 34-1 and 34-2, similarly snap down over the two side rail frame tubes 14-1 and 14-2, just in front of two back vertical tubular supports 44-1 and 44-2, the latter not visible in FIG. 1.

Both sets of clips, 32-1 and 32-2, and 34-1 and 34-2, are fixedly mounted on the internal frame 36, in fixed spacing to fit between a related pair of front and rear vertical tubular supports, to prevent shifting of the seat cushion in response to any wriggling of a child occupant.

For a larger child, the seat 30 is raised from its seating position of FIG. 1, and rotated in a horizontal plane, around a vertical axis, through 180°, to a reversally directed position that will place the face 30-1, in back, in FIG. 1, to face forwardly on the front seat, in the position shown in FIG. 2.

In FIG. 2, the two clips 32-2 and 34-2, that were not visible in FIG. 1, are now positioned to be visible from the same side of the seat as in FIG. 1.

It will be observed, upon comparing FIG. 1 and FIG. 2, that the relative positions of the positioning clips, according to their distance from their respective front faces, of the seat cushion 30, serve to determine the position of the seating cushion 30 with respect to the same corresponding points on the frame, and thus the seating cushion 30 in FIG. 2 is positioned to project forward on its horizontal supporting frame 20.

In both FIGS. 1 and 2, the vertical portion of the back seat frame 24 is shown covered with a back-rest cushion 40 that covers the front, back sides of the frame 24.

Thus, by means of the location of the positioning clips on the seat cushion 30, the position of the seat cushion 30 on its supporting frame can be controlled to vary the amount of forward projection of the seat beyond the under frame structure 20, so that the seating depth of the seat cushion 30 may be controlled to accommodate a small child or a larger child with long legs, in comfortable seating on the bus seat, resting against the back rest.

Figure 4:
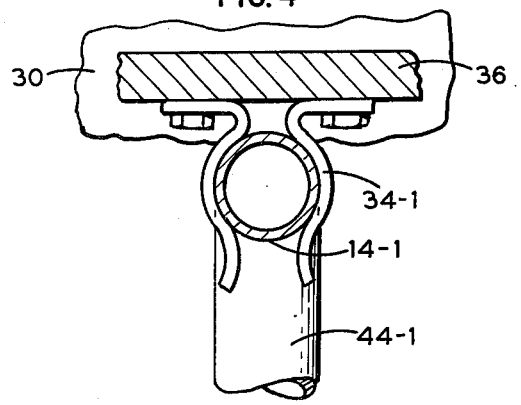
FIG. 4 is a view immediately in front of one of the positioning clips, to show how it fits over the horizontal tube of the supporting frame, and then braces against the vertical support.

In FIG. 4, one clip in two parts is shown supported on the seat cushion inside frame 36, to snap fit over a horizontal tube section of the horizontal structural seat to support the seat cushion 30.

The invention is not necessarily limited to the details of construction here illustrated since such details may be variously modified without departing from the spirit and scope of the invention as set forth and defined in the claims.

What is claimed is:

1. An adjustable two-position school bus seat, to accommodate adults or children, to provide a seat to have either of two positions, with different depth dimensions, namely, a forward position and a retracted position, said bus seat comprising:
   a back rest frame;
   a back rest cushion supported on said back rest frame;
   a foundation support structure for said back rest frame and seat, generally, said foundation support embodying two rigid structural elements disposed at a predetermined fixed spacing;
   a movable seat cushion to rest on said foundation support structure, and movable to be selectively manually disposed with either transverse edge facing to the front to provide a seat immediately in front of said back rest cushion;
   connection means between said back rest frame and said foundation to define a space for accommodating a portion of said seat cushion in retracted position;
   and self-gripping and self-releasing clamping means secured to said cushion bottom surface, and serving also as positioning means to fit onto the foundation support structure and to wedge against said two rigid structural elements in position to locate the cushion in either selected position, and to hold said seat cushion against undesired movement, and said clamping means are depending lugs, and include one pair positioned at a short distance from one transverse edge of the seat cushion in a first position, and include a second pair of depending lugs positioned at a long distance from the other transverse edge of the seat cushion, so the forward positioning of either transverse edge will be controlled according to the positioning of the respective pair of lugs relative to said structural elements of the foundation support structure.

* * * * *